United States Patent [19]

Karsdon

[11] Patent Number: 5,791,202
[45] Date of Patent: Aug. 11, 1998

[54] TETRAHELICAL/CURVED BICYCLE CRANK-ARM CONNECTING ROD FOR HUMAN/MECHANICAL POWERED MACHINES AND THE LIKE

[76] Inventor: Jeffrey Karsdon, 200 E. 16th St. (15H), New York, N.Y. 10003

[21] Appl. No.: 579,339

[22] Filed: Dec. 27, 1995

[51] Int. Cl.⁶ .................................................. B62M 3/00
[52] U.S. Cl. ................................ 74/594.1; D12/123
[58] Field of Search ....................... 74/594.1, 594.4, 74/579 R; D12/123

[56] References Cited

U.S. PATENT DOCUMENTS

| D. 23,640 | 9/1894 | Grinden | D12/123 |
|---|---|---|---|
| D. 27,781 | 10/1897 | Anderson et al. | D12/123 |
| D. 32,349 | 3/1900 | Price | D12/123 |
| D. 365,049 | 12/1995 | Kuylman | D12/123 |
| 626,630 | 6/1899 | Peerstone | 74/594.1 X |
| 3,221,464 | 12/1965 | Miller | |
| 5,020,287 | 6/1991 | Woods | |
| 5,125,288 | 6/1992 | Amiet | 74/594.1 |

FOREIGN PATENT DOCUMENTS

| 843684 | 7/1939 | France | 74/594.1 |
|---|---|---|---|
| 888628 | 12/1943 | France | 74/594.1 |

*Primary Examiner*—Khoi Q. Ta
*Assistant Examiner*—Mary Ann Battista
*Attorney, Agent, or Firm*—Hamilton, Brook, Smith & Reynolds, P.C.

[57] ABSTRACT

A curved, tetrahelix bicycle crank arm composed of a helical array of tetrahedra. This design will transmit the propelling force away from the top dead center point providing more efficient use of the propelling energy. With this Tetrahelical design a hollow core is possible that will reduce weight and permit lubrication if needed without reducing strength. This design is also applicable to the connecting rod of internal or external combustion engine.

13 Claims, 5 Drawing Sheets

TETRAHELICAL/CURVED BICYCLE CRANK-ARM CONNECTING ROD FOR HUMAN/MECHANICAL POWERED MACHINES AND THE LIKE

TECHNICAL FIELD OF THE INVENTION

This invention relates to a curved crank to displace the downward maximal force on the pedal or connecting rod away from dead center.

BACKGROUND-DESCRIPTION OF PRIOR ART

This invention is concerned mostly with but not limited to bicycles or other crank and/or connecting rod powered devices. A novel method to transmit power, human or non-human, to a bicycle drive axle of vehicle drive train. To increase the driving force, such that the driving force is directed away from the top dead center, provide the maximum force because when the crank/connecting rod is at the highest point it displaces this force away from the top dead center point. The advantage of this is by displacing the maximal force away from the top dead center point, the force applied to the crank will be at the maximal stroke height thus the driving force is used more efficiently.

Various crank/connecting rod designs are generally well known. Such designs are primarily used in human powered bicycles or non-human powered vehicles with internal or external combustion engines, be it fossil fueled, steam or other propellant, used on land, sea or air. The purpose of such a design is to transmit the force from the power source to the driving mechanism.

For mechanisms have been proposed for more efficient bicycles by displacing the top dead center, U.S. Pat. No. 4,793,208 [displace top dead center] to Bregnard et. al. (1988) or by extending the crank length, U.S. Pat. No. 4,807,491 to Stuckenbrok (1989), U.S. Pat. No. 4,882,945 to Trevizo (1989), U.S. Pat. No. 4,960,013 to Sander (1990) mechanically extended and shortened the crank. U.S. Pat. No. 4,816,009 to Philipp (1989) further refined these techniques.

Similar and more recent techniques for increasing the efficiency of the bicycle in particular have been used: U.S. Pat. No. 5,207,119 varied the length of the pedal arm, U.S. Pat. No. 5,199,324 rotated the crank arm, U.S. Pat. No. 5,179,873 to Girvin (1993) used a hollow crank to reduce crank weight without loss of strength, U.S. Pat. No. 5,157,988 to Pinkstock (1992) used a spring to store energy while U.S. Pat. No. 5,060,536 to Boys (1991) used a flexible crank arm with a rectangular cross section and U.S. pat. No. 5,010,785 to Romero (1991) used a tubular crank arm and U.S. Pat. No. 5,125,288 to Amiet (1992) used an arcuate crank that could be filled with mercury.

An internal or external combustion engine connecting rod is another application of this technology. U.S. Pat. No. 4,890,588 (1990) to Tillman rotated the crank arm/connecting rod a number of degrees past top dead center. U.S. Pat. No. 4,957,069 to Mederer (1990) prolonged the connecting rod, U.S. Pat. No. 4,966,109 to Pusic and Memed (1990) used a hydraulic connecting rod for use in both internal-combustion and steam engines while U.S. Pat. No. 5,136,987 to Schechter, Simko and Levin (1992) used a hydraulically variable connecting rod to vary length which was improved in U.S. Pat. No. 5,178,103 to Simko (1993). U.S. Pat. No. 5,201,287 to Blish (1993) used an extension rod operated hydraulically, mechanically or electrically to vary stroke length. U.S. Pat. No. 4,974,554 to Emery (1990) raised the piston head at top dead center |increase the mechanical and input/output efficiencies of an engine (internal or external combustion) by providing for an increased effective moment arm offered by the crankshaft rod journal during the period of peak combustion pressure|. U.S. Pat. No. 5,025,757 to Larsen (1991) pivoted the engine block to change the top dead center distance. U.S. Pat. No. 5,186,127 to Cuatico (1993) used an off-set connecting rod to obtain a better mechanical advantage in the internal combustion engine.

SUMMARY OF THE INVENTION

All of these designs are suited only for their single purpose, are complicated in design, are complicated in construction with many moving parts and expensive to make. The present invention is directed toward displacing the propelling force away from the top dead center of a crank/connecting rod and overcomes the disadvantages of the prior art which are suited for only one purpose, have a complicated design, have a complicated construction with multiple parts and expensive to construct. This invention is novel for it is adaptable to many applications, it is simple in design, it is simple in construction with no or few moving parts and it is inexpensive to construct.

(a) These prior art devices are suited for one specific purpose e.g. a bicycle, an internal or an external combustion engine.

(b) These prior art devices have complicated designs requiring complicated machine tooling.

(c) These prior art devices have complicated construction with many moving parts that are prone to failure and difficult to repair.

(d) These prior art devices are expensive to construct, maintain or repair.

OBJECTS AND ADVANTAGES

Accordingly, my patent has a different object and advantages which are:

(a) A design suitable for many applications i.e. human powered vehicles and/or machines or non-human or mechanical powered vehicles and/or machines.

(b) A design that is simple and basic in nature with great strength.

(c) A design that is simple to construct for it is based on a repetition of a basic structure and has no moving parts.

(d) A design that is inexpensive to construct due to its basic and repetitive nature.

Further objects and advantages are to provide an apparatus and method which can be used easily and conveniently in any vehicle used on land, sea, air and space, i.e. human powered vehicle e.g. bicycle or non-human/mechanical powered vehicles e.g. internal/external combustion to efficiently transmit the driving force to the drive train by displacing the top and bottom dead center points, which will be light and strong, which will be easy to construct, easy to maintain, which will have a minimum of moving parts.

BRIEF DESCRIPTION OF THE DRAWINGS

In the drawings, closely related figures have the same number but different alphabetic suffixes.

DETAILED DESCRIPTION OF THE DRAWINGS

Figure 1A:
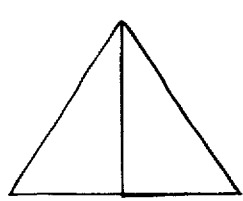
FIG. 1A is a tetrahedron, frontal view.
Figure 1B:
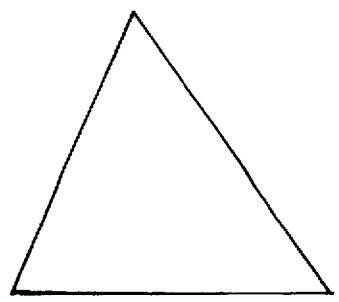
FIG. 1B is a tetrahedron, side view.
Figure 1C:
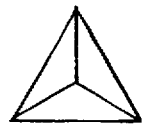
FIG. 1C is a tetrahedron, top view.
Figure 2A:
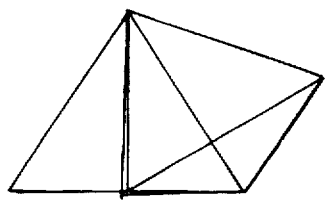
FIG. 2A is two triple bonded tetrahedra, frontal view.
Figure 2B:
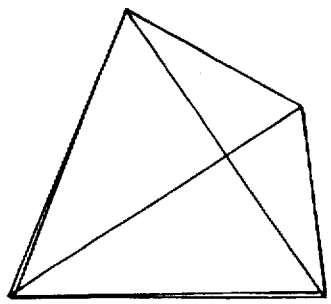
FIG. 2B is two triple bonded tetrahedra, side view.
Figure 2C:
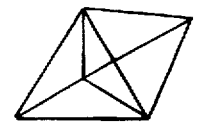
FIG. 2C is two triple bonded tetrahedra, top view.
Figure 3A:
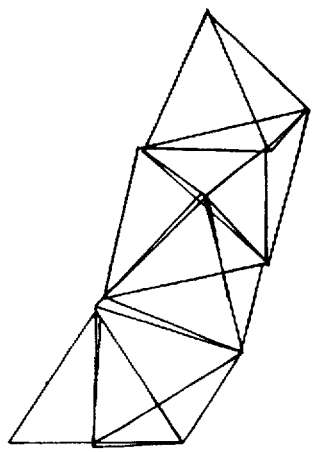
FIG. 3A is a helical array of triple bonded tetrahedra forming a tetrahelix, frontal view.
Figure 3B:
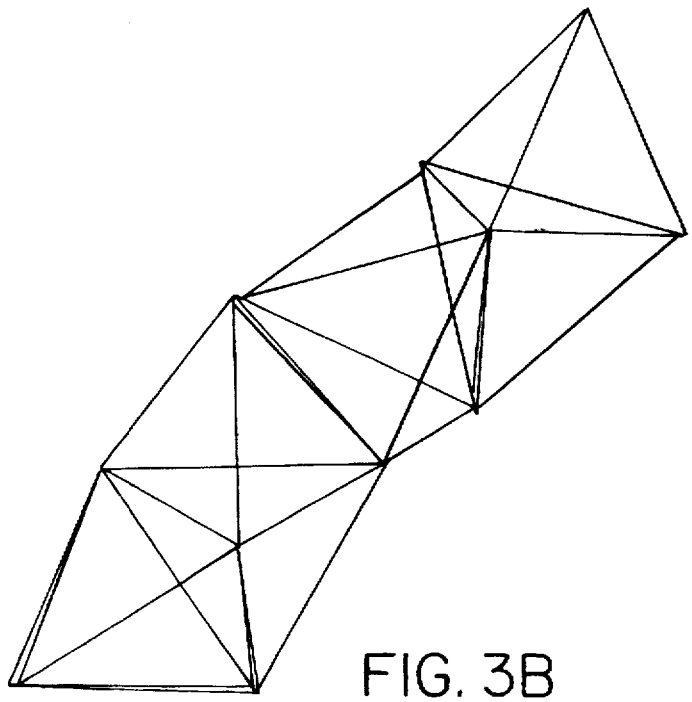
FIG. 3B is a helical array of triple bonded tetrahedra forming a tetrahelix, side view.
Figure 3C:
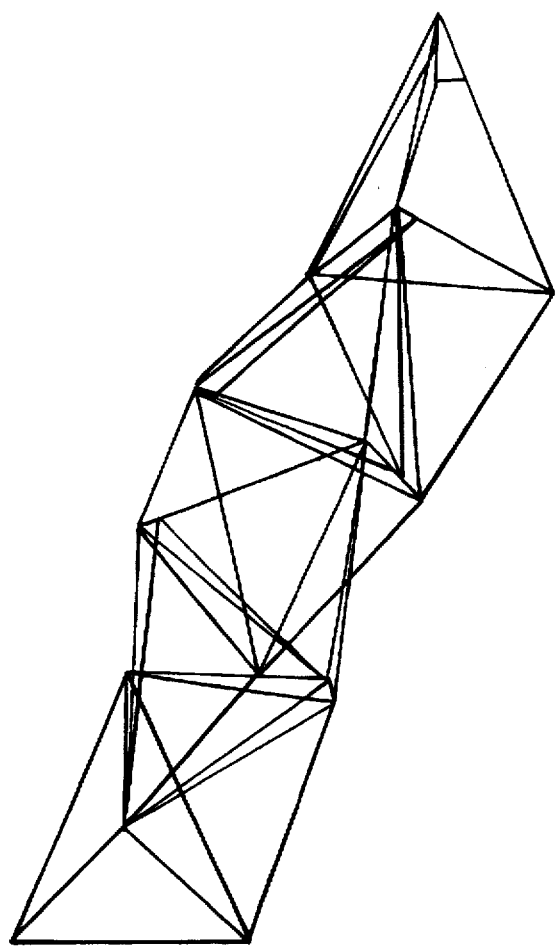
FIG. 3C is a helical array of triple bonded tetrahedra forming a tetrahelix, top view.
Figure 4:
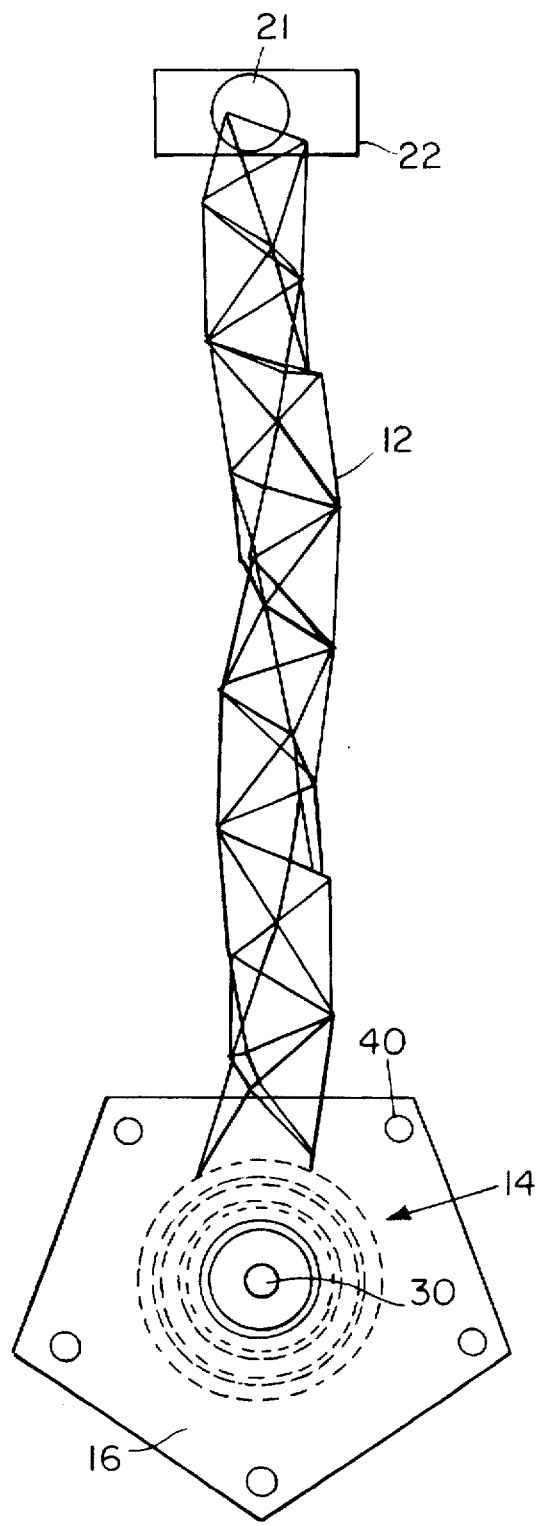
FIG. 4 is a schematic lateral view of the tetrahelix crank illustrating several features of the present invention with an important feature thereof, namely the curved nature of the present invention, the simple design, displacement of the top dead center point.
Figure 5:
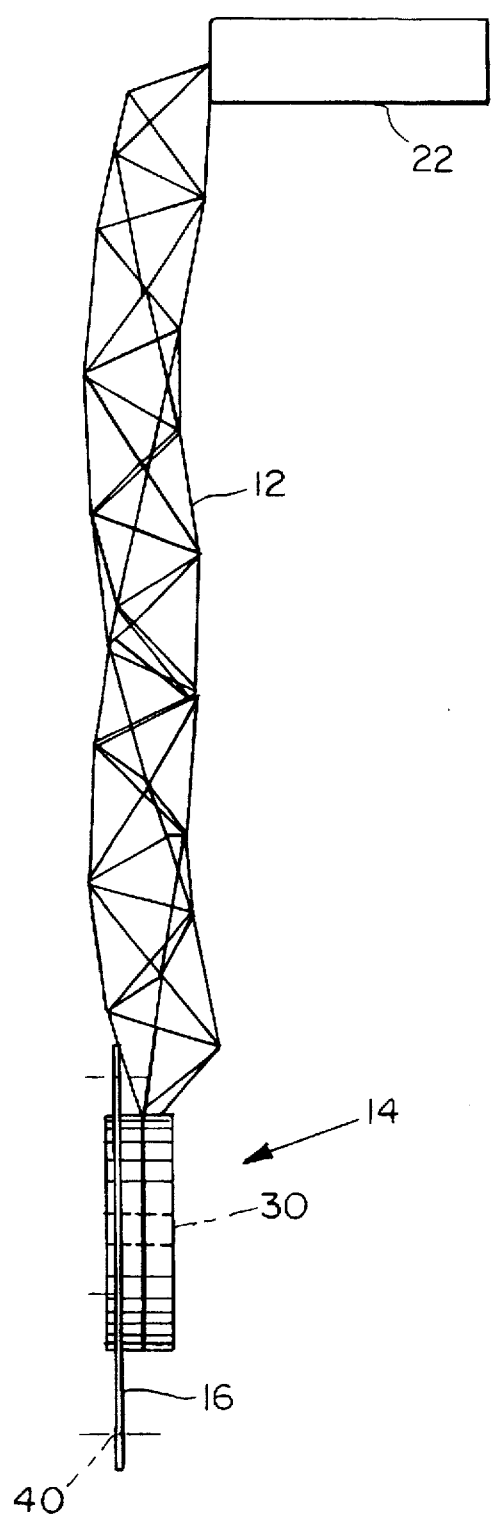
FIG. 5 is a schematic view from the front of the right handed tetrahelix crank.
Figure 6:
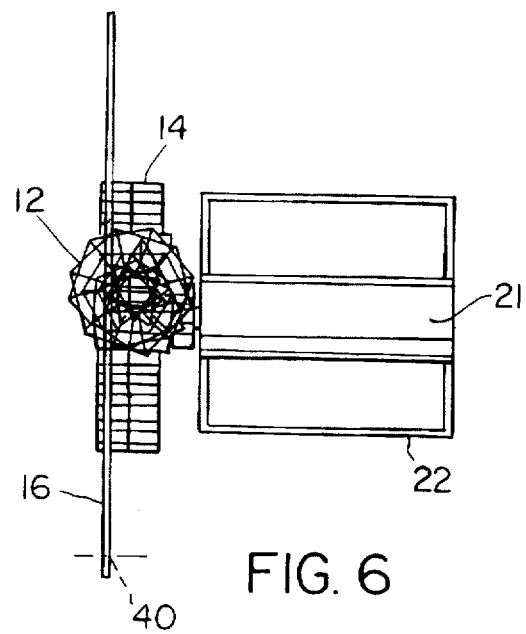
FIG. 6 is a schematic cross sectional top view of the right handed tetrahelix crank illustrating features of the present invention with an important feature thereof, namely the potential for a hollow central core that may permit easy lubrication and weight reduction without loss of strength.

In the Drawings, 10 is a Tetrahelical bicycle crank arm assembly; 12 is a hollow Tetrahelical crank arm; 14 is a cylindrical hub (27 mm outside diameter, standard mounting hole 30); 16 is a flange; 20 is a overall Tetrahelical bicycle crank arm assembly; 21 is a pedal mounting lug (0.562"×20 thread); 30 is a standard mounting hole (disposed axially through its center to accept a end of a standard bottom bracket axle 31); 31 is a standard bottom bracket axle; and 40 is a mounting holes (for bolting flange to larger chain sprocket (not shown)).

Figure 7:
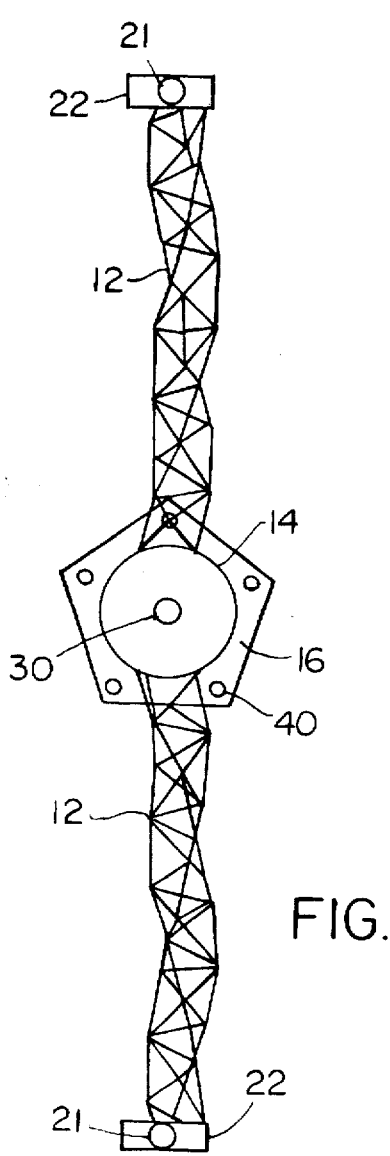
FIG. 7 is a schematic lateral view of the right and left tetrahelix cranks illustrating several features of the present invention with an important feature thereof, namely the curved nature of the present invention, the simple design, displacement of the top/bottom dead center points.
Figure 8:
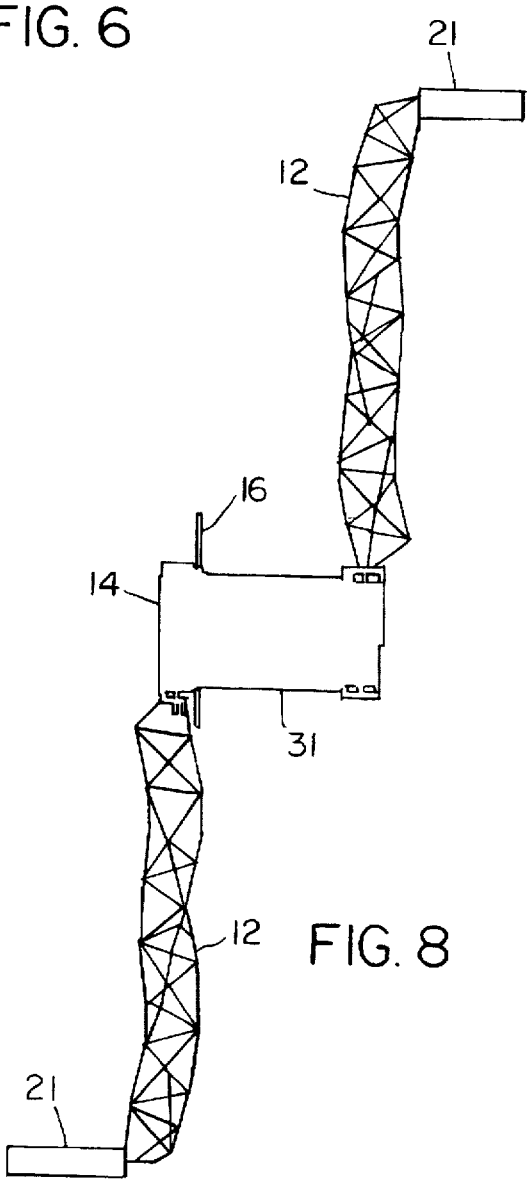
FIG. 8 is a schematic view from the front of both right and left handed tetrahelix cranks.
Figure 9:
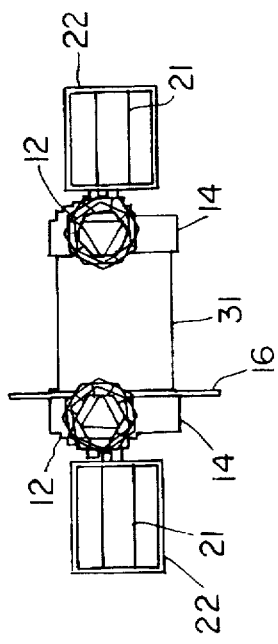
FIG. 9 is a schematic cross sectional top view of the right and left handed tetrahelix cranks.
Figure 10:
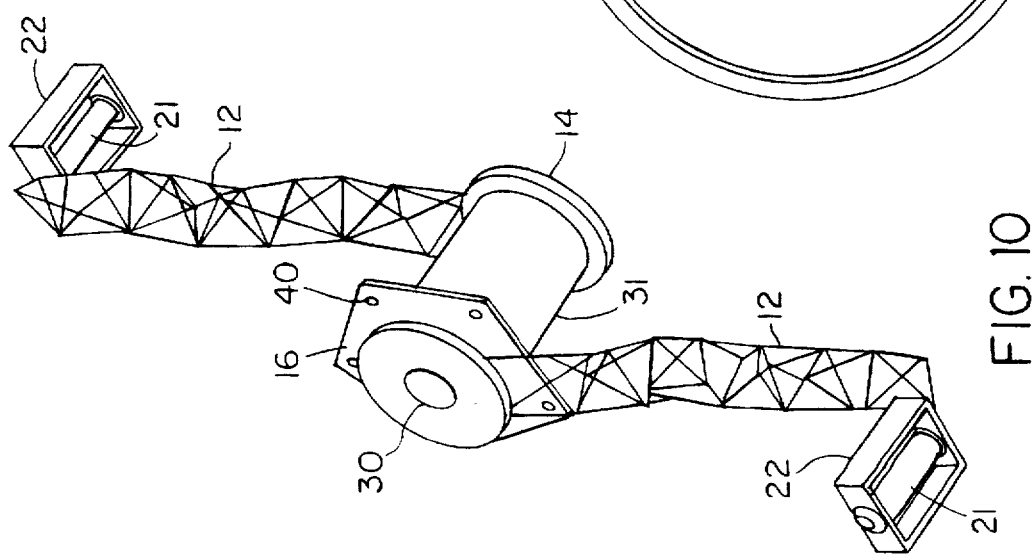
FIG. 10 is a schematic isometric view of the right and left handed tetrahelix cranks.
Figure 11:
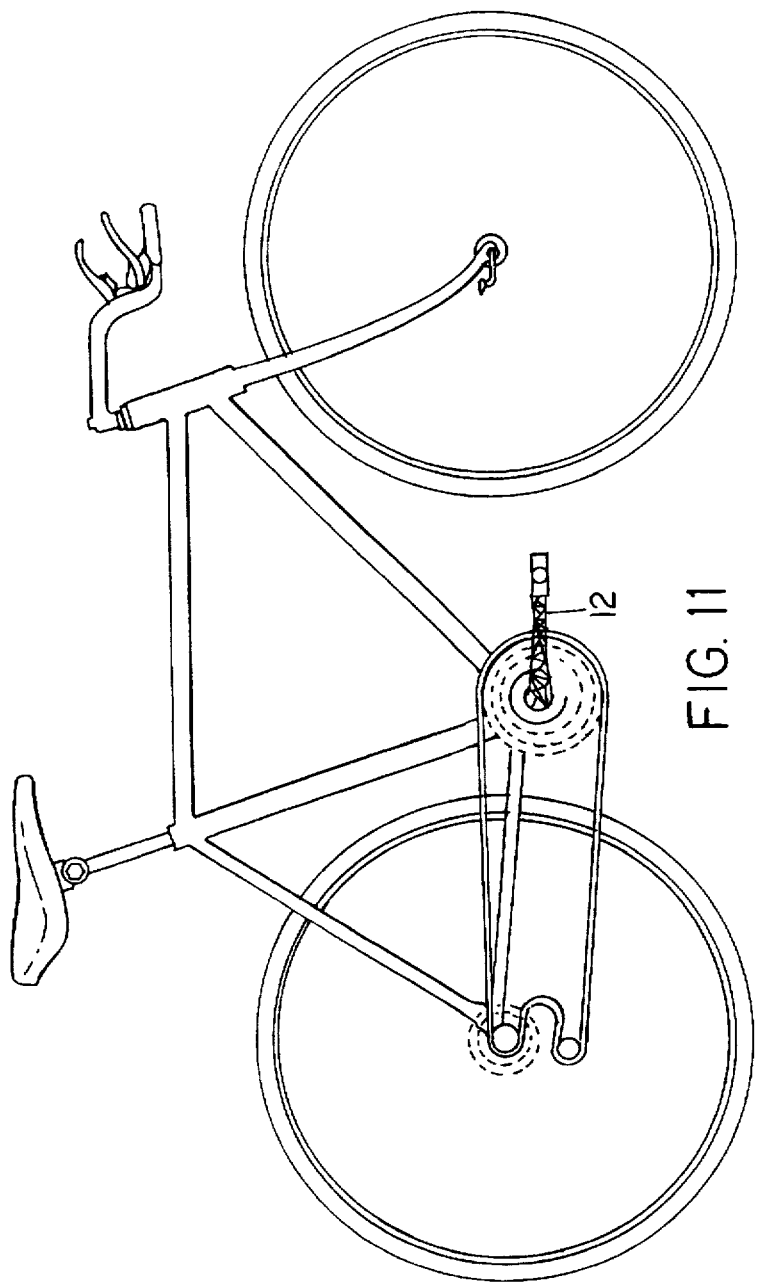
FIG. 11 is a schematic view of the tetrahelix crank/ connecting rod on a bicycle.

The schematic view in FIG. 7 shows the tetrahelix crank with a plurality of helical arrayed tetrahedra of the present invention.

A typical embodiment of the tetrahelix crank assembly 10 shown includes a hollow centered crank arm 12 attached to a cylindrical hub 14. The hub is for mounting onto an axle 31. The cylindrical hub 14 is attached to a flange 16 which will transmit the propelling forces to the drive wheel or chain sprocket mounting (not shown). The crank arm/ connecting rod may be fabricated of any suitable material e.g. steel, plastic or fiber-reinforced composites. The center of the crank/connecting rod may be hollow, maintaining strength while reducing weight and permitting lubrication if needed.

The hub 14 is about 27 mm in outside diameter and has a standard mounting hole 30 disposed axially through its center to accept an end of a standard bottom bracket axle 31. The pedal mounting lug 21 has a 0.562"×20 thread and a standard pedal assembly 22.

The depicted tetrahelix crank arm 12 is for use on the right hand side 10 of the bicycle, it has a sprocket mounting flange 16 having a plurality of mounting holes 40. The preferred left hand tetrahelix crank arm assembly of the overall Tetrahelical bicycle crank arm assembly 20 is similar to the right hand tetrahelix crank assembly 12 except it has no sprocket mounting flange 16.

The tetrahelix crank arm 12 has a length between opposing hole 30 and the pedal mounting lug 21 centers of 155–185 mm.

SUMMARY, RAMIFICATIONS, AND SCOPE

Accordingly, the reader will see that the tetrahelix crank arm/connecting rod of this invention can be used to displace propelling force away from the top and bottom dead points easily and conveniently thus making the most efficient use of the propelling force. Further, the tetrahelix crank arm/ connecting rod has the additional advantages in that it is easy to construct;

it is easy to manufacture;

it permits maximum strength with minimum weight;

it allows for a hollow center to reduce weight without loss of strength;

it allows for a hollow center to provide lubrication when needed;

it allows for any material to be used in its construction and still have maximum strength;

it allows for use in human powered vehicles such as a bicycle as well as in machine driven vehicles either internal or external combustion that can be used on land, sea, air or space.

it allows for use in human powered machines such as a generators pulley system as well as in machines that can be used on land, sea, air or space.

Although the description above contains many specificities, these should not be construed as limiting the scope of the invention but as merely providing illustrations of some of the presently preferred embodiments of this invention. For example, the tetrahelix crank/connecting rod can be used not only for vehicles but in various sporting equipment or tools to provide the most efficient use of the propelling energy.

Thus the scope of the invention should be determined by the appended claims and their legal equivalents, rather than by the examples given.

I claim:

1. A crank arm assembly comprising:

a) a hub;

b) a tetrahelical crank arm having a proximal end and a distal end, the arm being attached to the hub at the proximal end at a connecting junction and displacing a top dead center point of the crank arm assembly.

2. The crank arm assembly of claim 1 wherein the crank arm is constructed from one of steel, plastic, or reinforced fiber composite.

3. The crank arm assembly of claim 1 wherein the crank arm is used in a human or non-human powered vehicle.

4. The crank arm assembly of claim 1 wherein the crank arm assembly propels a bicycle.

5. The crank arm assembly of claim 1 wherein the crank arm is constructed from plural polyhedrons.

6. The crank arm assembly of claim 1 wherein the crank arm is hollow.

7. The crank arm assembly of claim 6 wherein the hollow crank arm permits lubrication.

8. The crank arm assembly of claim 1 wherein the crank arm is constructed from plural tetrahedrons.

9. The crank arm assembly of claim 8 wherein the tetrahedrons are bonded to each other.

10. The crank arm assembly of claim 8 wherein the tetrahedrons are bonded to each other at triangular faces thereof.

11. The crank arm assembly of claim 8 wherein the tetrahedrons are hollow.

12. The crank arm assembly of claim 8 wherein the tetrahedrons are bonded together to form a helical shape.

13. The crank arm assembly of claim 12 wherein the helical shape moves the top dead-center point of the crank arm relative to a straight arm.

* * * * *